United States Patent

[11] 3,596,856

| [72] | Inventor | Gene R. Drew<br>El Centro, Calif. |
|---|---|---|
| [21] | Appl. No. | 884,856 |
| [22] | Filed | Dec. 15, 1969 |
| [45] | Patented | Aug. 3, 1971 |
| [73] | Assignee | The United States of America as represented by the Secretary of the Navy |

[54] ASTERISK CONFIGURED DROGUE PARACHUTE
8 Claims, 8 Drawing Figs.

[52] U.S. Cl. ..................................................... 244/145
[51] Int. Cl. ..................................................... B64d 17/02
[50] Field of Search ............................................ 244/145, 152

[56] References Cited
UNITED STATES PATENTS
| 3,331,573 | 7/1967 | Winker et al. ................ | 244/145 |
| 3,350,040 | 10/1967 | Sims et al. ..................... | 244/145 |
| 3,458,161 | 7/1969 | Pohl et al. ..................... | 244/145 (X) |
| 3,474,990 | 10/1969 | Flatau ........................... | 244/152 (X) |
| 3,521,841 | 7/1970 | Finney et al. ................. | 244/145 |

*Primary Examiner*—Milton Buchler
*Assistant Examiner*—Carl A. Rutledge
*Attorneys*—George J. Rubens, John W. McLaren and J. C. Warfield, Jr.

ABSTRACT: A drogue parachute fabricated of elongated panels in a crisscross arrangement forming an asterisk construction, the canopy being provided with wedge-shaped sectors attached at the confluence point of adjacent panels so that the parachute will exhibit increased drag forces at low speed and decreased drag forces at higher speeds hen compared with existing parachute stabilization systems presently in use.

INVENTOR.
GENE R. DREW
BY
George J. Rubens
ATTORNEYS

INVENTOR.
GENE R. DREW

ASTERISK CONFIGURED DROGUE PARACHUTE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to parachutes and more particularly to an improved drogue parachute stabilization system for military ejection seats.

The parachute stabilization system presently in use by the military services for ejection seats referred to generally as the Martin-Baker seat ejection system is illustrated in the U.S. Pat. No. 3,055,621, issued on Sept. 25, 1962. In that patent device the parachute stabilization system includes two parachutes for deploying the main parachute, the first and smallest parachute referred to as a controller parachute activating a second drogue parachute. The controller parachute in that patent was designed to function so as to cause the drogue parachute to squid and avoid rupturing of the canopy during high-speed ejections. In addition to the higher manufacturing cost of prior art dual stabilization systems, it has been found by tests that they provide relatively poor stabilization because the drag forces are marginally low at low speeds of 0 to 100 knots causing an undesirable delay in the extraction of the main parachute as well as inadequate stabilization of the seat-man mass. Furthermore, for ejections at speeds around 600 knots, the drag forces are marginally high increasing the probability of structural failure of the seat.

It is believed the above-described situation is the natural result of using a parachute stabilization system having the same drag area over a wide operating speed range of 0 to 600 knots.

Reference is also made to another prior art development described in a currently pending Pat. application, Ser. No. 734,693, filed in June 1968, now U.S. Pat. No. 3,521,841 issued July 28, 1970, by R. G. Finney and A. J. Sidebottom entitled "Modular Drogue Parachute." That invention teaches the fabrication of a single drogue-type stabilization system for the purpose of delivering an explosive device requiring a high speed, fast fall through its reefed condition, and of maintaining stability and a precise trajectory throughout its descent. The Modular Parachute is fabricated of a plurality of narrow panels medially secured together at their overlapping portions to form a crisscross construction. The free ends of each panel are secured to the load suspension lines by bridles.

Studies have shown that the Modular Drogue Parachute, while performing well as an ordnance delivery vehicle, cannot overcome the aforementioned limitations in the dual stabilization system for ejection seats, in providing increased drag forces at low speeds to expedite the deployment of the main parachute. Increasing the width or length of the panels of the Modular Drogue Parachute to increase the drag of the parachute at low speeds in the opened condition, will result in unacceptably high forces at high speeds when in the squidded condition.

SUMMARY OF THE INVENTION

The present invention provides a single drogue stabilization parachute which will exhibit increased drag forces at low air speeds so as to provide improved seat-man mass stabilization, and to expedite the deployment of the main parachute, and provide decreased drag forces at high speeds when compared with the existing Martin-Baker dual parachute stabilization system.

These unique results are achieved by modifying the heretofore described Modular Drogue Parachute, by the addition of wedge-shaped cloth sectors at the confluence point of adjacent panels. It has been found that the addition of these small wedge-shaped sectors, within predetermined limits, provide unusual results and enables a single parachute to replace the prior art dual parachute systems as well as providing more effective stabilization. For example, with a wedged-shaped sector having a radius from the center of the parachute of 2 times the width of each panel (as compared to the radius without the wedge-shaped sectors of 1.307 times the width of each panel) the squidded drag area of the Modular Drogue Parachute is increased by 133 percent without significantly increasing the total drag area when the drogue chute is fully opened.

STATEMENT OF THE OBJECTS OF THE INVENTION

One object of this invention is to provide a single drogue parachute which will exhibit increased drag forces at low speeds and decreased drag forces at higher speeds as compared to conventional dual parachute stabilization systems.

Another object is to provide a drogue parachute which will substantially increase its squidded drag area without significantly increasing its total drag area when the parachute is fully opened.

Still another object of the invention is to provide a drogue stabilization system which will extend the operating envelope of the system without extensive modification or replacement of the conventional basic ejection seat system, and a corollary object is to provide such a drogue parachute having a minimum increase in weight and volume and which can be manufactured at a low cost.

Figure 1:
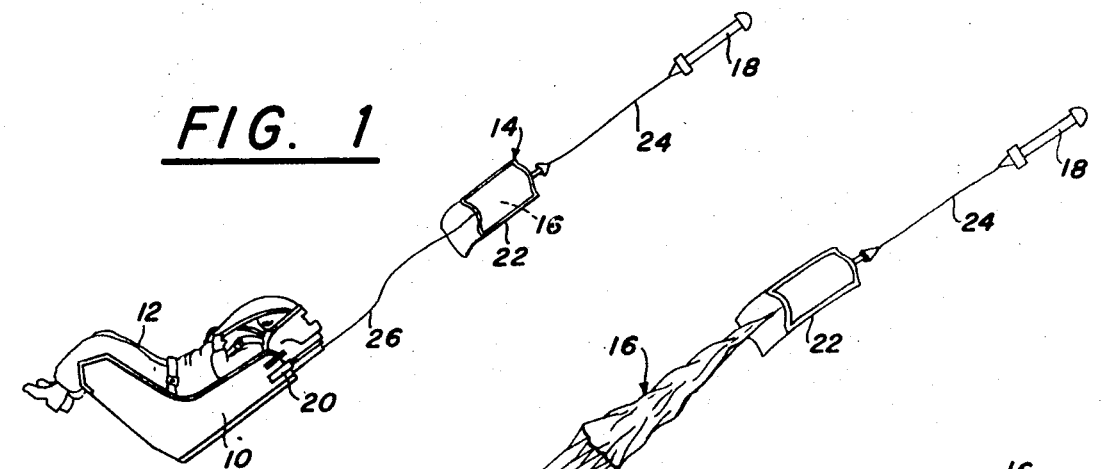
FIG. 1 is a diagrammatic illustration of the initial deployment of a drogue stabilization system for an ejection seat showing a deployment bag containing the drogue parachute being ejected by a slug.

Referring to the drawing where like reference numerals refer to similar parts throughout the figures there is shown in FIG. 1 a conventional military-type ejection seat 10 supporting a pilot 12, the seat-man combination having been ejected from an aircraft, not shown, causing the initial deployment of a drogue stabilization system 14 including a drogue parachute 16.

Figure 2:
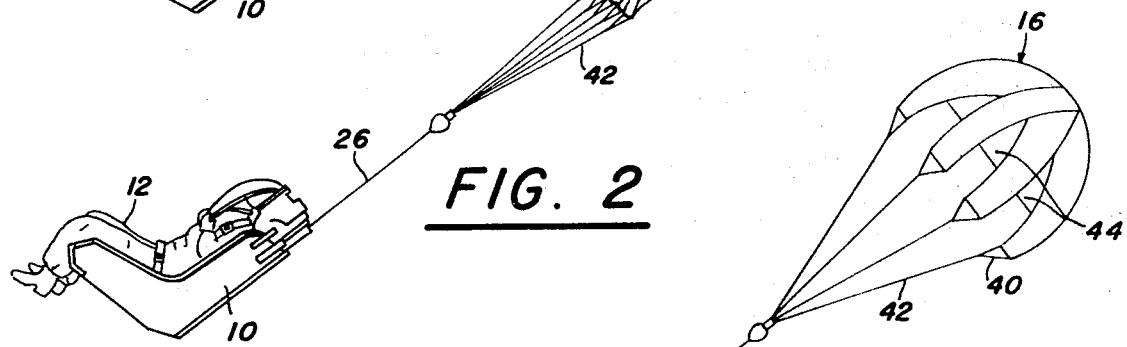
FIG. 2 is the system of FIG. 1 a fraction of a second later showing the bag strip-off sequence and the deployment of the drogue parachute.

The specific drogue stabilization system 14 being illustrated is described and claimed in my copending Pat. application Ser. No. 5065, filed on 1-22-70, and forms no part of the present invention apart from the details of parachute 16. Stabilization system 14 employs a rocket or slug 18 which is ejected from a drogue gun 20 mounted in seat 10, the slug through drawline 24 pulling out from the seat a bag 22 containing drogue parachute 16. The force of slug 18 also applies tension on bridle 26 that unlocks bag 22 to release parachute 16 which is withdrawn therefrom as shown in FIG. 2. Bag 22, drawline 24, and slug 18 are expendable and they continue travelling in a trajectory to fall free and avoid interference with drogue parachute 16.

Figure 6:
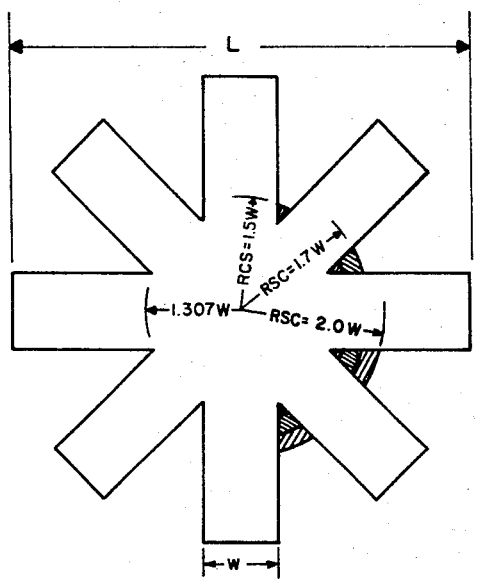
FIG. 6 is a diagrammatic plan view of a model blank of the invention parachute showing dimensions and design parameters.

The construction details of drogue parachute 16 forms the subject matter of the present invention and will be further described with reference to FIGS. 5 and 6.

Figure 4:
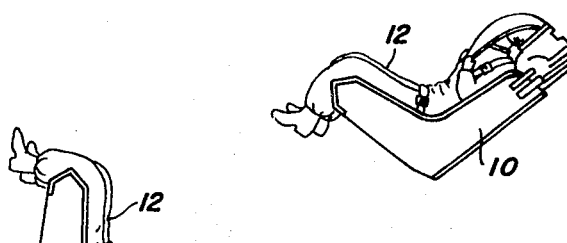
FIG. 4 is the system of FIG. 2 later in sequence, showing the drogue parachute in a fully open condition at low speed.
Figure 3:
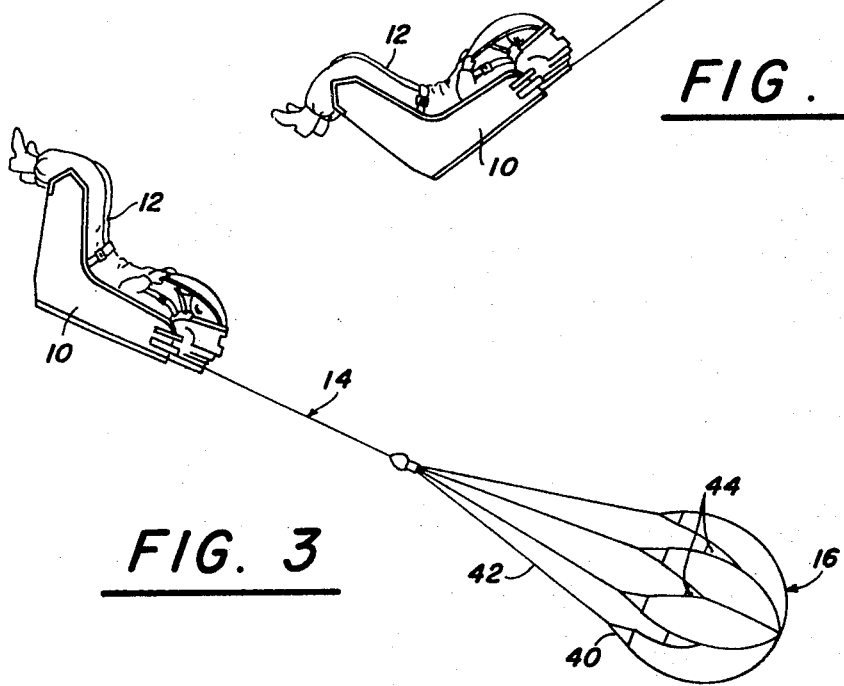
FIG. 3 is the system of FIG. 2 showing the drogue parachute in a squidded condition at high speed.

FIGS. 3 and 4 show two conditions during development of the parachute after bag strip-off depending on the speed of ejection from the aircraft. In FIG. 3, the parachute is shown deployed at high speed where the canopy of the parachute is in a squidded condition. It will be observed that slug 18 and bag 22 have deployed drogue parachute 16 as quickly as possible so that the parachute can provide the designed drag forces to stabilize the seat-man mass and deploy the main parachute (not shown). In FIG. 4 parachute 16 is shown in the opened condition after a low speed ejection i.e., 0 to 400 ft./sec., where the invention parachute provides the necessary drag force to stabilize the man-seat mass in the desired orientation prior to deployment of the main parachute.

Figure 5:
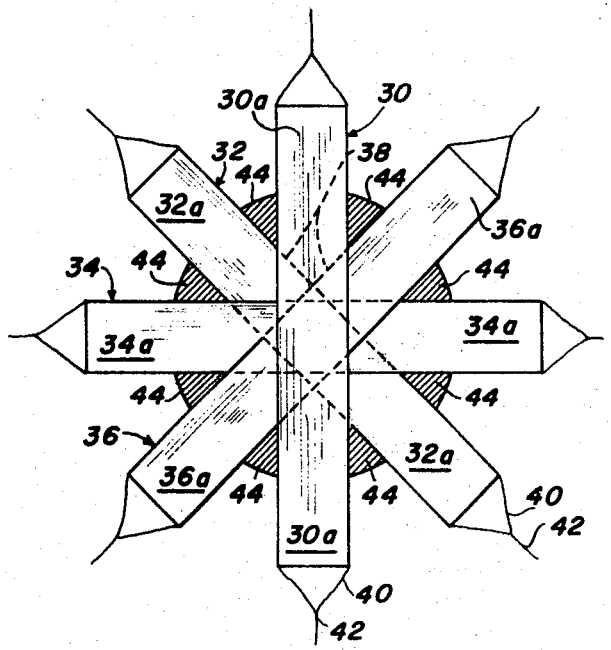
FIG. 5 is a plan view of a 4 panel asterisk parachute constructed according to the teaching of this invention.

FIG. 5 shows the details of the invention parachute constructed of a plurality of rectangular panels, four being illustrated, namely, 30, 32, 34, and 36. The panels are radially disposed and circularly spaced in equal increments being secured together, such as by stitching 38, at their central overlapping portions to form eight gore portions 30a to 36a disposed 45° apart forming an asterisk design. A bridle arrangement 40 connects each gore to a suspension line 42 that supports the load, which in the illustrated embodiment is the seat 10, via the main chute which in FIGS. 1 to 4 is still housed in the seat and not yet deployed.

The specific improvement over the Modular Parachute immediately described above resides in the addition of wedge-shaped cloth sectors 44 sewn or otherwise attached at the confluence point of adjacent gores of the panels. Eight sectors are used in the embodiment of FIG. 5. The radius of sectors 44 may be expressed as a function of the width of the panels. FIG. 6 illustrates a study model of a 4-panel modular parachute blank in which W is the width of each panel, the length L, and the ratio L/W. The term RSC represents the constructed radius-squidded. The expression "constructed" means the dimensions of the parachute canopy in a flat condition as when constructed such as is shown in FIG. 5. The expression "projected" means, as the term implies, the dimension of a deployed chute (FIGS. 3 or 4) as projected against a plane surface. In the study model, for a standard Modular Parachute (unmodified) the RSC=1.307W, and the RSC for a modified Modular Parachute (invention chute) is shown with three different dimensioned sectors, namely, RSC=1.5W, 1.7W and 2.0W.

Figure 7:
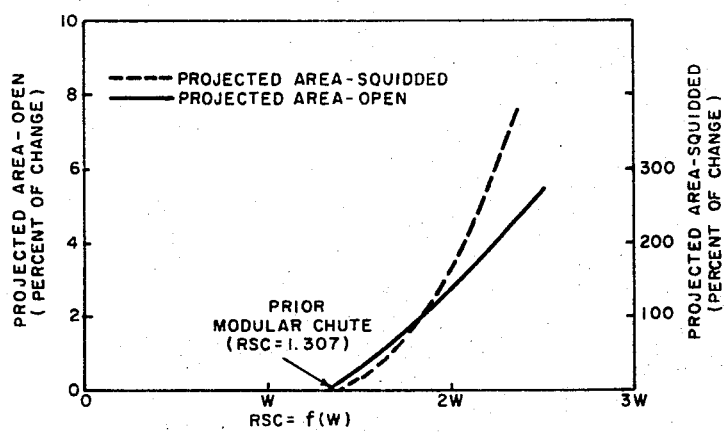
FIG. 7 is a graph showing the percent of change of the projected area of the invention drogue parachute, both in an open and squidded condition, for different dimensions of the invention drogue parachute compared to the prior art Modular Parachute.

The effects of deployment of the invention chute for different values of RSC are shown in FIG. 7 in terms of percent change, in both the "projected area—open" and "projected area—squidded," over a standard Modular Parachute (RSC=1.307W). As can be seen from the curves of FIG. 7 the optimum value of RSC is substantially in the order of 2W, at which point the drag area (or drag force) on the invention chute in the squidded condition is increased as much as 133 percent over the prior art Modular Parachute. The drag forces of the invention chute in an open condition with RSC=2W provides an increase of only about 4 percent which small increase can be tolerated without the likelihood of chute blowout. However, it should be noted from FIG. 7 that the rate of change of the open chute rapidly increases for values of RSC beyond the value of 2W, increasing the likelihood of damage to the chute, seat and possibly injury to the pilot. When the parachute is employed for use in the preferred embodiment values of RSC between 1.9 to 2.1 is believed to be optimum.

Figure 8:
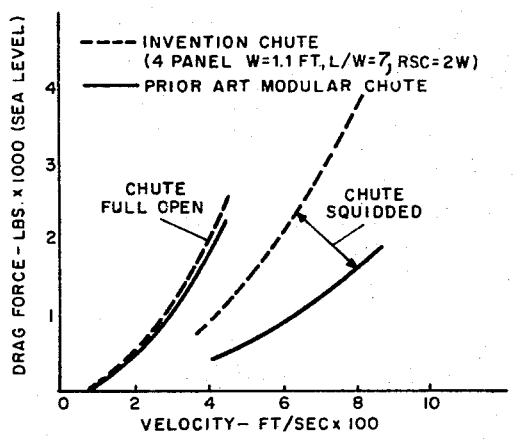
FIG. 8 is a graph comparing the drag forces on both a prior art Modular Parachute and a chute constructed according to the invention, for the chutes in both full open and squidded conditions.

The above-stated results can also be seen in FIG. 8 where the drag forces are plotted against velocity at ejection, for both the invention chute (asterisk chute) and the prior art standard Modular Parachute, for the chutes in both full open and the squidded conditions. It is apparent that there is very little difference in drag forces for both chutes in the full open, which is desired since both chutes exhibit an adequate amount of drag force in the full open condition to accomplish the assigned task. However, when the chutes are deployed at high speed and in a squidded condition, the invention chute provides a substantial increase in the drag forces over the prior art Modular Parachute.

Following the teaching of the present invention by the attachment of small sectors of the parachute material at the confluence point of the panels, the performance of the prior art Modular Parachute can be dramatically enhanced in the squidded condition by substantially increasing the drag forces without materially affecting the drag forces of the chute in the full open condition. Thus the advantages of the prior art Modular Parachute of being lightweight, compact, and inexpensive to manufacture can be retained in the invention chute with an accompanying improvement in performance over a wide operating range.

Although the specific embodiment illustrates the use of the invention parachute to improve ejection seat stabilization, it should be obvious that the invention can be adapted to other aerodynamic deceleration application.

Obviously many modifications and variations of the present invention are possible in the light of the above teachings. It is therefore to be understood that within the scope of the appended claims the invention may be practiced otherwise than as specifically described.

What is claimed is:

1. In a parachute fabricated of a plurality of panel-shaped gores arranged crisscrossed and secured medially, said gores having free ends extending radially to form an asterisk configuration, the improvement residing in:
   a plurality of sections secured to adjacent panels at their confluence point, said sections being of a predetermined shorter length than the gores, whereby the effective drag area of the parachute in a squidded condition is substantially increased without significantly increasing the drag area of the parachute when in a full open condition.

2. The improvement of claim 1 wherein said sections are wedged-shaped.

3. The improvement of claim 2 wherein said sections are formed as a sector.

4. The improvement of claim 3 wherein the radius of said sectors taken from the center of the parachute are a function of the width of the gore panels.

5. The improvement of claim 4 wherein the radius of said sectors are approximately in the order of twice the width of the panels.

6. The improvement of claim 5 wherein said parachute is composed of eight gores.

7. A drogue parachute comprising:
   a canopy comprising a plurality of spaced rectangular panel portions extending radially outward to form an asterisk configuration;
   said canopy having wedge-shaped portions formed at the confluence of the panel portions;
   the radius of said wedge portions being a function of the width of the panel portions whereby the effective drag area of the parachute in a squidded condition is substantially increased without significantly increasing the drag area of the parachute when in a fully opened condition.

8. The drogue parachute of claim 7 wherein the radius of said sectors are approximately in the order of twice the width of the panels.